Oct. 23, 1934.   A. W. GAY   1,978,156
INTERNAL HEATING ARM
Filed Oct. 1, 1931   2 Sheets-Sheet 2
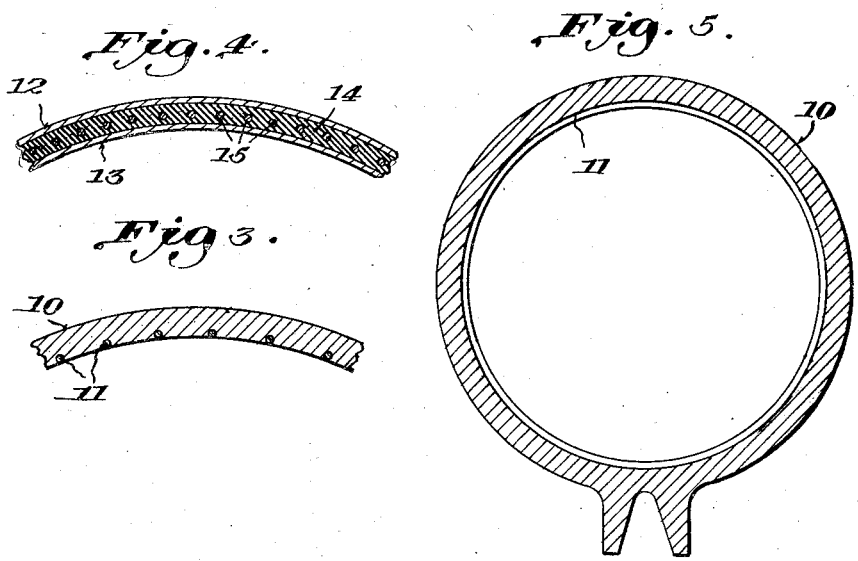
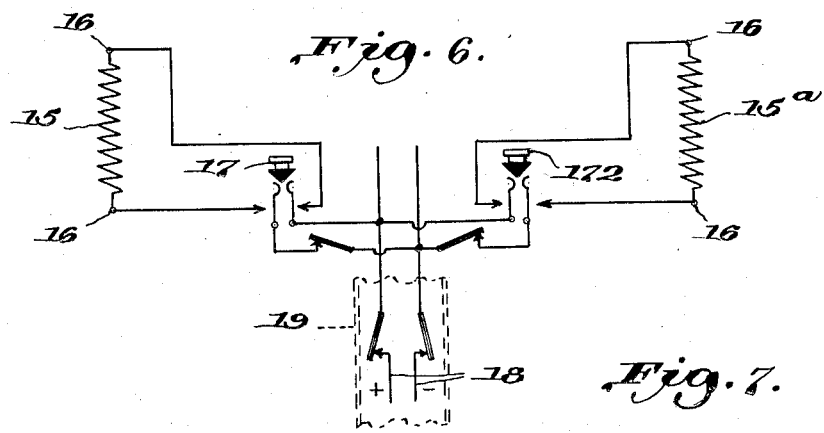
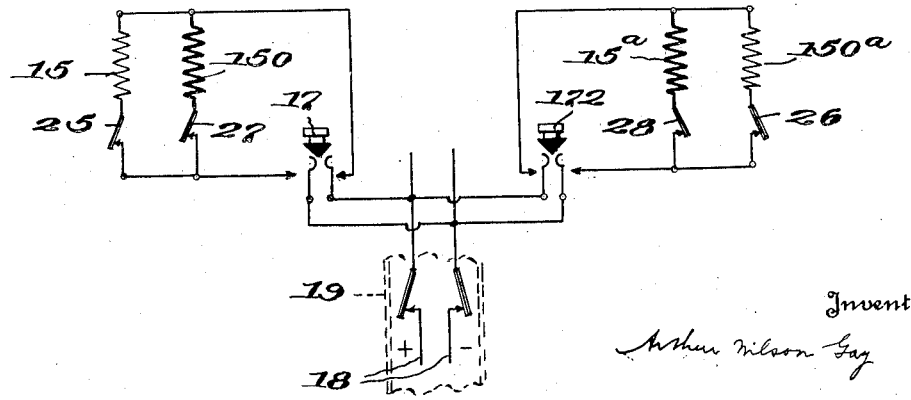
Inventor
Arthur Wilson Gay
By Edward E. Clement
Attorney Patented Oct. 23, 1934

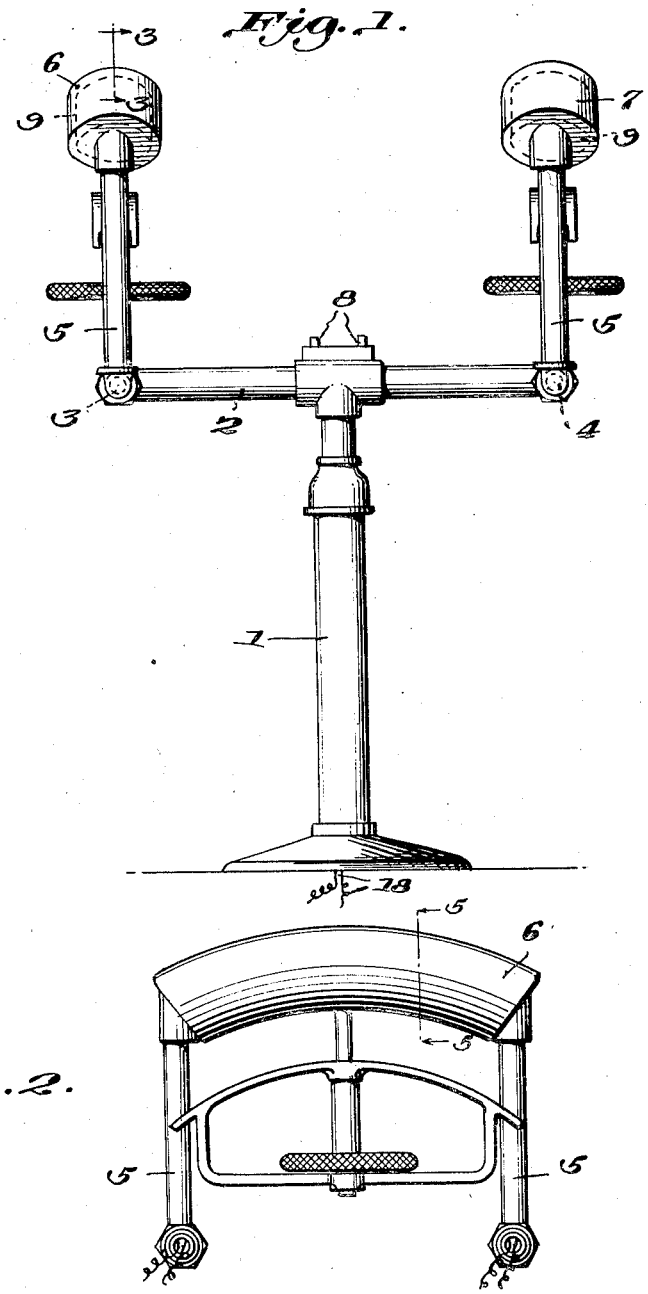

1,978,156

UNITED STATES PATENT OFFICE 1,978,156

INTERNAL HEATING ARM

Arthur Wilson Gay, Reading, Ohio, assignor to The Gewert Manufacturing Company, Reading, Ohio, a corporation of Ohio Application October 1, 1931, Serial No. 566,323

3 Claims. (Cl. 219—19)

My invention relates to means for curing gum rubber, and especially such as are used in the repairing of pneumatic tires. It has for its object to produce an improved method of and means for supporting and heating the tire under repair.

Heating cores are now used inside of a tire casing when under repair and such cores are heated by steam. This requires a considerable equipment in the form of steam fitting and boilers for supplying the steam, the installation and operation of which involves extra expense as well as loss of time and inconvenience. In addition to this, the ordinary steam heated core can only be heated as a whole, regardless of its size or area of the spot in the tire which is under repair.

I attain my object by substituting electricity for the steam as a heating medium, furnishing the heat electrically by means of a device which I shall describe in detail hereinafter and claim as new. Very briefly stated, this device will be built up the same as the flexible spotter described and claimed in my copending application, Serial No. 530,657, filed April 16, 1931, and in addition to being made of flexible material it may also be made of a rigid material such as aluminum, white metal or brass. In order to support the tire, I employ a core with suitable supporting frame or legs, and on this I mount my internal heating device in the form of a shell so as to slide as a sleeve over the supporting core and rest between this core and the casing. As a variant of this form I may also build the heating device itself in the form of a hollow or solid core with the heating elements embedded therein in proximity to the surface that receives and supports the tire. In such case it will replace the steam heated core entirely.

An important point in regard to this electrically heated core is the provision of means for thermostatically controlling the heating, making it possible to use a winding of any desired rating as to operate on current through a wide range of voltages.

In addition to its other novel features, I wind my device so that it may be heated either sectionally or in totality. Thus, one or several patches may be vulcanized and cured at one time, and where sectional heating is employed, of course there is an economy of current as well as an avoidance of over curing or over heating other portions of the tire.

As a preferred form of this invention, I propose to use a shell composing the arm preferably of cast aluminum with a heating element molded in it. I have found that the heating element can be suitably insulated and when so molded into the shell is not only very efficient as a heater, but lends great simplicity to the structure, having added advantages of low cost and extreme ruggedness. As before stated, I provide thermostatic control and sectional or intermediate connections from the winding to a suitable switch, whereby only a portion may be heated at a time when small cures are made. A secondary advantage in this construction is that steam heated arms now in use may be remodeled at small expense, by applying my electric heater to and upon them without any other change of equipment.

In applying this internal curing arm I find it desirable to have it brought up to curing temperature very rapidly, which can only be accomplished by the use of a heating element of very high wattage rating. After the curing temperature is reached, however, this high wattage rating makes temperature regulation very difficult, and it is also very detrimental to the thermostat which is used for regulating the temperature. Furthermore, after the arm has once reached the curing temperature only a very small amount of power is required to hold it there. In order to meet these conditions and produce the desired result, I provide two heating elements in the arm, one of low rating which will take just a little more than sufficient current to maintain curing temperature, and another with a rating sufficiently high so that when it is working in conjunction with the low rating element it will bring the arm to curing temperature in the required time. Each of these elements is controlled by its own separate thermostat, the two heating elements are wound side by side and with their thermostats are connected in parallel across the current supply circuit. The thermostat controlling the low rating element is set to function at the curing temperature, while the other thermostat controlling the high rating element is set to break its circuit just before the curing temperature is reached. The temperature of the arm is carried on up to curing temperature by the low rating element and the temperature lag that always exists with such rapid heating. By this arrangement the high rating element will be permanently cut out of the circuit at all times when the arm is at curing temperature, and I claim for this arrangement improved temperature regulation and the elimination of the necessity for a heavy service thermostat to continually make and break a heavy current.

My invention is illustrated in the accompanying drawings, in which

Fig. 1 is an end view of a pair of arms of the type described herein, mounted upon a stand.

Fig. 2 is a side view of one arm removed from the stand.

Fig. 3 is a section on the line 3—3 of Fig. 1, cutting the heating wires at right angles.

Fig. 4 is a view similar to Fig. 3, showing a modification thereof.

Fig. 5 is a cross section on the line 5—5 of Fig. 2, showing a heating wire embedded or cast in the body of the hollow supporting arm.

Fig. 6 is a diagram illustrating the method of wiring my heater arm.

Fig. 7 is a diagram similar to Fig. 6 illustrating the use of high and low rating thermostats and heating elements.

Referring to the drawings, and first to Fig. 1, 1 is a vertical column carrying a crosshead 2 and parallel horizontal frame arms 3 and 4. Above each arm 3 and supported thereon by vertical posts 5 is the tire supporting arm 6 or 7. Means for vertical adjustment of the heating arm may be provided as usual, and within themselves form no part of the present invention.

The column 1, the crosshead 2, frame arms 3 and 4, and posts 5 are all shown as tubular and it should be noted that this gives an opportunity for running concealed wiring preferably through the floor and up through the column 1 and the other tubes to the respective heating elements on the arms 6—7. Controlling switches for the two arms are shown at 8, and may be of any suitable or desired type.

The supporting arms 6—7 as usually constructed are of metal and are steam heated. As shown in Fig. 1 however, there are no steam connections but instead the wiring passes through the column 1 to the switches 8 and is there distributed both ways to the several sections of the heating elements in the respective arms 6 and 7. In Fig. 1, the numeral 9 indicates my heating shell or pad as a separate unit applied to the arm 6 or 7. The detail of the shell is shown in Figs. 3, 4 and 5. In Fig. 3 which is a vertical longitudinal section on the line 3—3 of Fig. 1, 10 indicates the cast shell composing the arm, preferably of cast aluminum. 11 indicates the heating element which may be of any suitable material and properly insulated. The heating element may be placed in position by winding it on the sand core that is to be used in molding the arm just before the core is placed in the mold. After the heating element has been wound with the desired number of turns around the core, the core is placed in the mold and the aluminum or other suitable material is cast into the mold. When the aluminum or other material has cooled, it is removed from the mold and the sand core is broken out through either end of the hollow arm. After the core has been removed, the heating element can be seen partially exposed extending round and round the inside wall of the arm. After the thermostat has been placed inside the arm and the proper connections made, the ends of the arm are closed by means of end plates. It will be understood that the insulation is of some importance although any leakage of current from the element into the aluminum shell would only result in heating the latter, and with thermostatic control this additional heating would be taken care of. However, failure of the insulation is very unlikely to occur, as I contemplate using heat proof material, such as an oxide of the metal of which the heating element is composed, enamel baked on the heating element, or the like. Asbestos cord may be used, tightly wound on the wire, but this is not so good as the others, because it acts to some extent as a heat insulator.

Fig. 4 shows a similar section and illustrates another method of building up the arm. 12 and 13 are cast aluminum shells. 14 indicates rubber or asbestos paper. 15 is the heating element. In this case the heating element may first be formed up and embedded in the insulating material, then supported in the mold and the aluminum cast around it as before; or the heating element may be embedded in the insulation and plates of aluminum 12 and 13 may be applied thereto. I consider the casting preferable as it produces a simple rugged unit which is also cheap to make and very efficient.

Fig. 5 is a section taken across the arm so as to expose one complete turn of the element 11 in Fig. 3. This device shown in Fig. 5 may either be applied as a shell over the supporting arm 6 or 7 in Fig. 1, or it may be substituted for said supporting arm.

Referring to Fig. 6, 15 is the heating element having its convolutions developed or spread out in a plane with taps 16 taken off to contacts on a central switch 17 from which the main feeder wires 18 pass through suitable protective devices 19 to the main supply circuit 20. The switch 17 is duplicated at 172, to supply the duplicate parallel heating element 15a in the second arm on the frame. It is to be noted that the taps 16 in practice are formed up into a small cable which is led through one of the posts 5 and the cross head 2 to the connecting terminals on a switch 17 from which the main feeder wires pass down through the vertical column of the frame. In this way no wiring is exposed and for safety the wires that are concealed within the tubing of the machine may be and should be enclosed within an insulating conduit to prevent short circuits.

In this diagram I have shown three thermostats, one associated with each end of the heating coils and the third in the middle thereof for general control. It will be understood that these thermostats can be arranged in any desired manner that will attain my purpose. As a modification, a single thermostat may be employed mechanically mounted on a slide or otherwise secured to changeable fittings inside the arm, so that it may be removed from one part of the heating coil to another.

I am aware that there are other internal heating arms, and electrical heating devices therefor, such for example as those shown in U. S. patents to Shaler, 1,158,315, dated October 26, 1915, and to Booth, 1,317,124, dated September 23, 1919; but I present my present device as an improvement involving a new and greatly simplified method of construction, low cost, extreme ruggedness, means for maintaining uniform temperature at all points on its surface, capable of having a selected portion or portions heated at a time when small cures are made, allowing a saving of power and also capable of taking the place of the steam heated arms now in use by being placed over them or mounted in their stead without any other change of equipment. These and other features of novelty will be pointed out in the appended claims.

Referring to Fig. 7, 15 and 15a, 150 and 150a, are the low rating and the high rating heating elements respectively. 25 and 26 are low rating thermostats associated with the coils 15 and 150; and 27 and 28 are high rating thermostats controlling the coils 15a and 150a. These heating elements and their controlling thermostats, it will be observed, are in parallel across the feeder wires 18 and all of the thermostats are disposed inside the heating arm or otherwise so as to receive as directly as possible by conduction a part of the heat generated by the heating coils and transmitted through the heating arm. In operation when the switch 17 is closed the coils 15 and 150 will both receive current since both their thermostats 25 and 26 are cold and therefore hold their circuits closed. As soon as the curing temperature for which the thermostats have been set is closely approached and just before it is reached, the heavy service thermostat 26 acts to break the circuit of its heating coil 150. The temperature of the curing arm will be carried on up to a full curing degree by the low rating coil 15, which will finally be cut off by its thermostat 25; after which said thermostat 25 will maintain the tempertaure constant, and the heavy service coil 150 and its thermostat 26 will remain permanently cut out.

It will be understood that the same construction and the same operation hold for both arms shown in the drawings and additional thermostats may be employed if desired with appropriate connections which will be evident to those skilled in the art.

What I claim is:

1. An internal heating arm for vehicle tires comprising a curved tubular metal form adapted to receive and support the tire, a heating element consisting of wires laid up in helical convolutions inside the tubular form to uniformly heat the outside area of said form and embedded within the same, together with terminals through which to supply current to said heating element, so as to maintain a constant temperature therein and in the metal of the form.

2. An internal heating arm for vehicle tires comprising a curved tubular metal form adapted to receive and support the tire, a heating element consisting of wires laid up in helical convolutions inside the tubular form to uniformly heat the outside area of said form and embedded within the same, together with terminals through which to supply electric current to all or a portion of said convolutions, whereby to heat all or a portion of the surface area of the metal form, at will.

3. An internal heating arm for vehicle tires comprising a hollow curved tubular metallic form adapted to receive and support a tire under treatment, heating wires embedded in said form, terminals through which to supply current to said heating wires, and thermostatic controlling means within said form and in metallic contact therewith.

ARTHUR WILSON GAY.